United States Patent
Wei et al.

(10) Patent No.: US 11,546,946 B2
(45) Date of Patent: Jan. 3, 2023

(54) COMMUNICATIONS DEVICE, INFRASTRUCTURE EQUIPMENT AND METHODS

(71) Applicant: Sony Corporation, Tokyo (JP)

(72) Inventors: Yuxin Wei, Basingstoke (GB); Samuel Asangbeng Atungsiri, Basingstoke (GB); Hideji Wakabayashi, Basingstoke (GB); Vivek Sharma, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 78 days.

(21) Appl. No.: 17/253,617

(22) PCT Filed: Jun. 14, 2019

(86) PCT No.: PCT/EP2019/065771
§ 371 (c)(1),
(2) Date: Dec. 18, 2020

(87) PCT Pub. No.: WO2019/243206
PCT Pub. Date: Dec. 26, 2019

(65) Prior Publication Data
US 2021/0266981 A1  Aug. 26, 2021

(30) Foreign Application Priority Data
Jun. 20, 2018 (EP) .................................. 18178844

(51) Int. Cl.
*H04W 74/08* (2009.01)
*H04W 72/04* (2009.01)
*H04W 40/22* (2009.01)

(52) U.S. Cl.
CPC ....... *H04W 74/0833* (2013.01); *H04W 40/22* (2013.01); *H04W 72/04* (2013.01)

(58) Field of Classification Search
None
See application file for complete search history.

(56) References Cited

U.S. PATENT DOCUMENTS

2012/0082088 A1  4/2012  Dalsgaard et al.
2014/0016534 A1  1/2014  Kim et al.
(Continued)

FOREIGN PATENT DOCUMENTS

WO    2017/179860 A1    10/2017

OTHER PUBLICATIONS

International Search Report and Written Opinion dated Aug. 1, 2019, received for PCT Application No. PCT/EP2019/065771, Filed on Jun. 14, 2019, 13 pages.
(Continued)

*Primary Examiner* — Kenny S Lin
(74) *Attorney, Agent, or Firm* — Xsensus LLP

(57) ABSTRACT

A method for transmitting data by a communications device in a wireless telecommunications network comprising a base station and a non-terrestrial network part, the method comprising determining that data is to be transmitted by the communications device to the base station via the non-terrestrial part, in response to the determining, selecting a random access preamble from a group of random access preambles, each of the random access preambles of the group being associated with one or more resource pools of communications resources for transmitting data, and transmitting the selected random access preamble.

20 Claims, 7 Drawing Sheets

(56) References Cited

U.S. PATENT DOCUMENTS

| | | | |
|---|---|---|---|
| 2018/0139778 A1* | 5/2018 | Chou | H04W 74/04 |
| 2019/0166632 A1 | 5/2019 | Byun et al. | |
| 2019/0215759 A1* | 7/2019 | Wei | H04W 74/0833 |
| 2022/0078858 A1* | 3/2022 | Matsuda | H04W 76/10 |

OTHER PUBLICATIONS

Zte et al., "Unified RACH Procedure", 3GPP TSG RAN WG1 Meeting No. 87, R1-1611273, Nov. 14-18, 2016, 9 pages.
Huawei et al., "Analysis of RACH Procedural Steps", 3GPP TSG RAN WG2 Meeting No. 98, R2-1705192, May 15-19, 2017, 7 pages.
Nokia et al., "Random Access Principles for New Radio", 3GPP TSG-RAN WG1 No. 87, R1-1612299, Nov. 14-18, 2016, 4 pages.
Huawei et al., "UL Data Transmission in RRC_INACTIVE", 3GPP TSG-RAN WG2 No. 96, R2-168544, Nov. 14-18, 2016, pp. 1-8.
Ericsson, "Baseline Solution for Small Data Transmission in RRC_ INACTIVE", 3GPP TSG-RAN WG2 No. 96, Tdoc R2-168713, Nov. 14-18, 2016, pp. 1-7.
3GPP, "3rd Generation Partnership Project; Technical Specification Group Radio Access Network; Study on New Radio (NR) to Support Non Terrestrial Networks" Release 15, 3GPP TR 38.811V0. 3.0, RP-172794, Dec. 2017, pp. 1-56.
Holma et al., "LTE for UMTS OFDMA and SC-FDMA Based Radio Access", Wiley, System Architecture Based on 3GPP SAE, 2009, pp. 25-27.

* cited by examiner

COMMUNICATIONS DEVICE, INFRASTRUCTURE EQUIPMENT AND METHODS

CROSS-REFERENCE TO RELATED APPLICATIONS

The present application is based on PCT filing PCT/EP2019/065771, filed Jun. 14, 2019, which claims priority to EP 18178844.9, filed Jun. 20, 2018, the entire contents of each are incorporated herein by reference.

BACKGROUND

Field

The present disclosure relates to communications devices, infrastructure equipment and methods for the transmission of data by a communications device in a cell of a wireless communications network provided by a non-terrestrial network part.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the third generation partnership project (3GPP) defined UMTS and Long Term Evolution (LTE) architectures, are able to support a wider range of services than simple voice and messaging services offered by previous generations of mobile telecommunication systems. For example, with the improved radio interface and enhanced data rates provided by LTE systems, a user is able to enjoy high data-rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems.

Future wireless communications networks will therefore be expected to routinely and efficiently support communications with a wider range of devices associated with a wider range of data traffic profiles and types than current systems are optimised to support. For example it is expected that future wireless communications networks will efficiently support communications with devices including reduced complexity devices, machine type communication (MTC) devices, high resolution video displays, virtual reality headsets and so on. Some of these different types of devices may be deployed in very large numbers, for example low complexity devices for supporting the "Internet of Things", and may typically be associated with the transmission of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes so-called "non-terrestrial networks", or NTN for short. The 3GPP has proposed in Release 15 of the 3GPP specifications to develop technologies for providing coverage by means of one or more antennas mounted on an airborne or space-borne vehicle [1].

Non-terrestrial networks may provide service in areas that cannot be covered by terrestrial cellular networks (i.e. those where coverage is provided by means of land-based antennas), such as isolated or remote areas, on board aircraft or vessels) or may provide enhanced service in other areas. The expanded coverage that may be achieved by means of non-terrestrial networks may provide service continuity for machine-to-machine (M2M) or 'internet of things' (IoT) devices, or for passengers on board moving platforms (e.g. passenger vehicles such as aircraft, ships, high speed trains, or buses). Other benefits may arise from the use of non-terrestrial networks for providing multicast/broadcast resources for data delivery.

The use of different types of network infrastructure equipment and requirements for coverage enhancement give rise to new challenges for efficiently handling communications in wireless telecommunications systems that need to be addressed.

SUMMARY

The present disclosure can help address or mitigate at least some of the issues discussed above.

According to the present technique there is provided a method for transmitting data by a communications device in a wireless telecommunications network, the wireless telecommunications network comprising a base station and a non-terrestrial network part. The method comprises determining that data is to be transmitted by the communications device to the base station via the non-terrestrial part, and in response to the determining, selecting a random access preamble from a group of random access preambles, each of the random access preambles of the group being associated with one or more resource pools of communications resources for transmitting data, and transmitting the selected random access preamble. The method further comprises receiving a random access response transmitted by the base station in response to the transmission of the selected random access preamble, the random access response indicating an identity of an activated resource pool, the activated resource pool being one of the one or more resource pools of communications resources for the transmission of the data to the base station via the non-terrestrial network part, and transmitting at least a portion of the data using the communications resources of the activated resource pool.

Embodiments of the present technique can provide an arrangement which may provide an improved data transmission scheme for the transmission of data by a communications device via a non-terrestrial network part.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
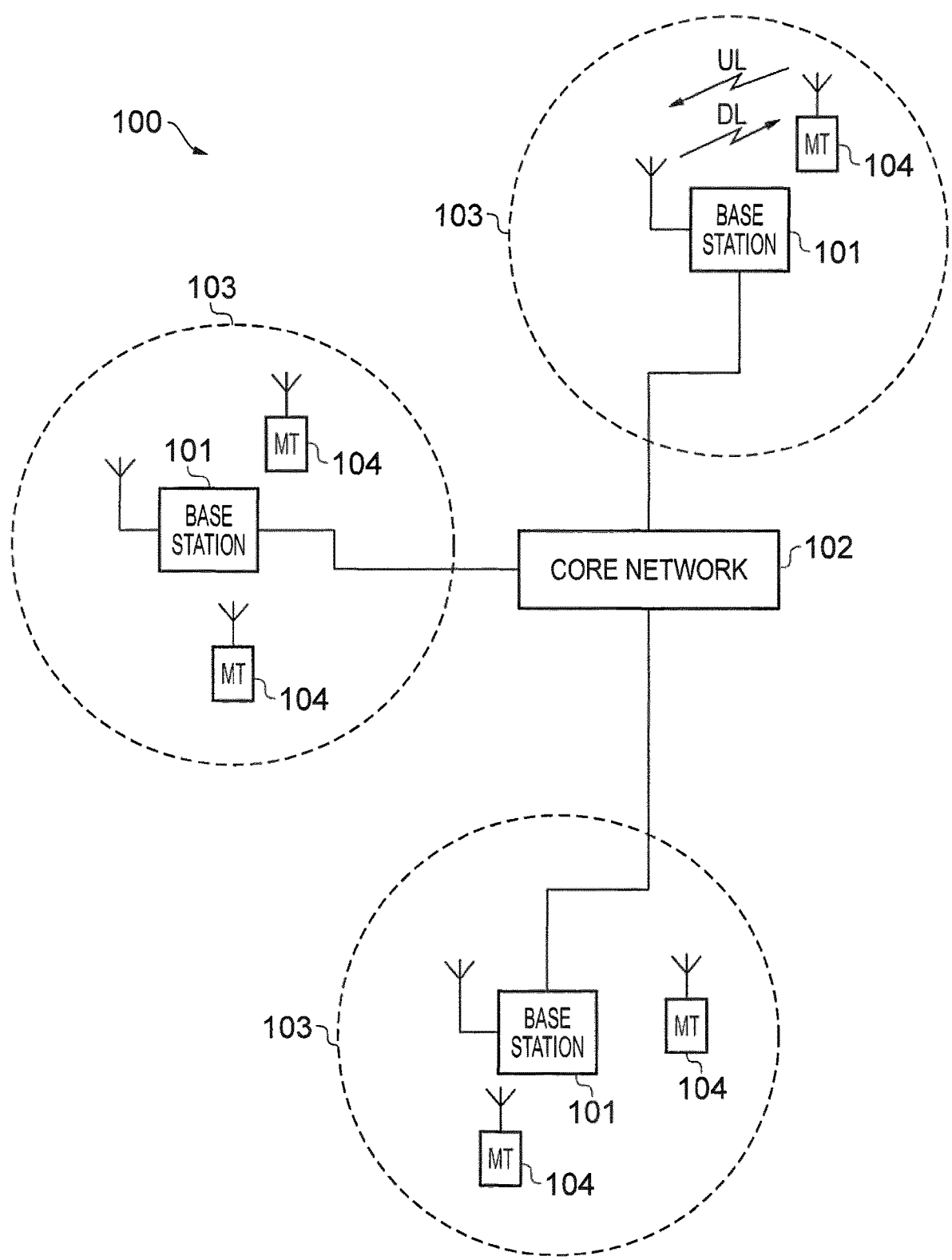
FIG. 1 schematically represents some aspects of a LTE-type wireless telecommunication system which may be configured to operate in accordance with example embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from terminal devices 104. Data is transmitted from the base stations 101 to the terminal devices 104 within their respective coverage areas 103 via a radio downlink. Data is transmitted from the terminal devices 104 to the base stations 101 via a radio uplink. The core network part 102 routes data to and from the terminal devices 104 via the respective base stations 101 and provides functions such as authentication, mobility management, charging and so on. Terminal devices may also be referred to as mobile stations, user equipment (UE), user terminals, mobile radios, communications devices, and so forth. Base stations, which are an example of network infrastructure equipment/network access nodes, may also be referred to as transceiver stations/nodeBs/e-nodeBs, g-nodeBs and so forth. In this regard different terminology is often associated with different generations of wireless telecommunications systems for elements providing broadly comparable functionality. However, example embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

Figure 2:
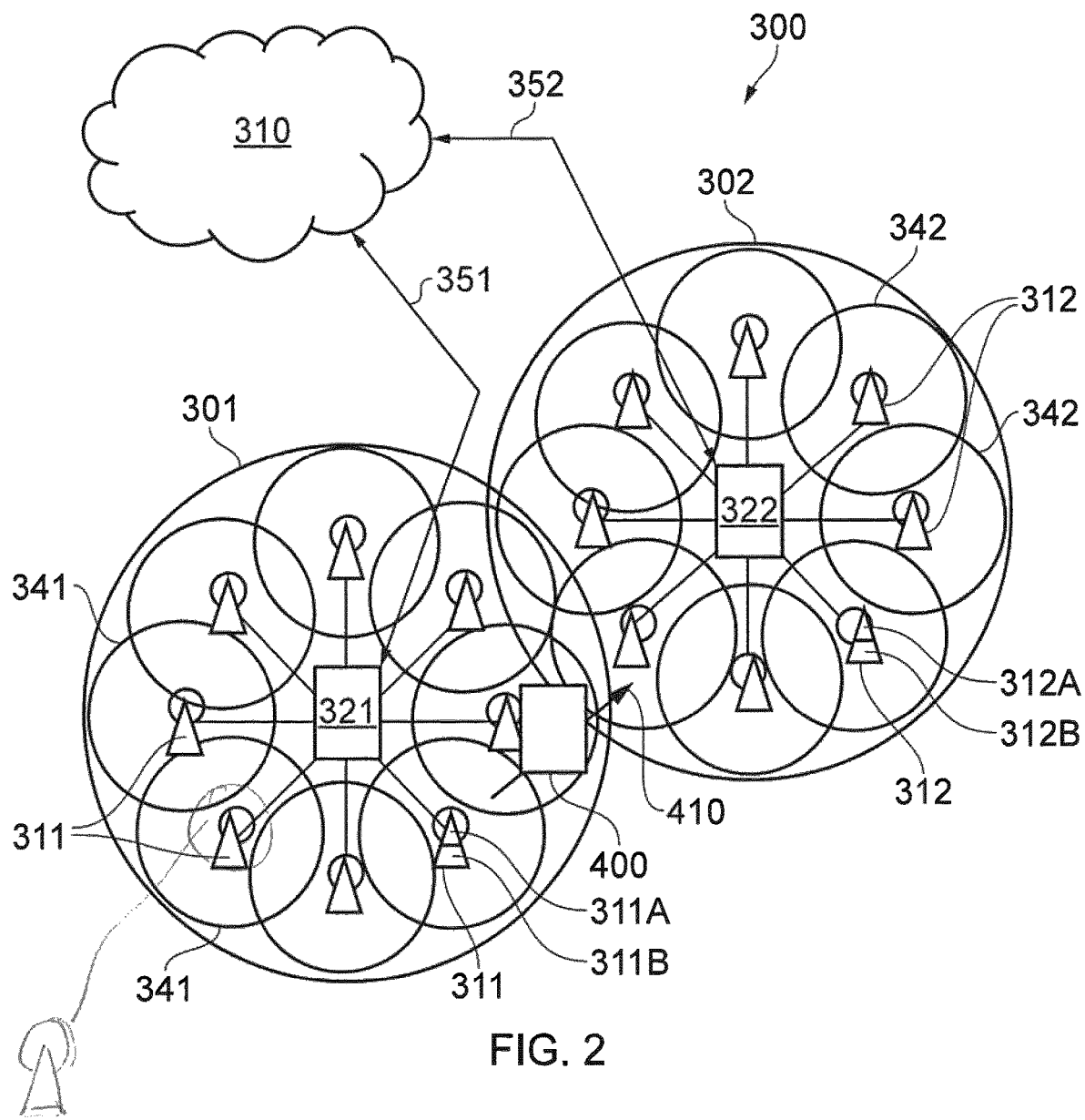
FIG. 2 schematically represents some example aspects of a new radio access technology (RAT) wireless communications network which may be configured to operate in accordance with embodiments of the present disclosure.

FIG. 2 is a schematic diagram illustrating a network architecture for a new RAT wireless communications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302.

In terms of broad top-level functionality, the core network component 310 of the new RAT communications network represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated that the subset of the distributed units in a cell which are currently active for a terminal device will depend, at least in part, on the location of the terminal device within the cell (since this contributes significantly to the radio channel conditions that exist between the terminal device and respective ones of the distributed units).

In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 321, 322 and/or a TRP 311, 312 of the kind shown in FIG. 2 which is adapted to provide functionality in accordance with the principles described herein.

In wireless telecommunications networks, such as LTE type or 5G type networks, there are different Radio Resource Control (RRC) modes for terminal devices. For example, it is common to support an RRC idle mode (RRC_IDLE) and an RRC connected mode (RRC_CONNECTED). A terminal device in the idle mode may transition to the RRC connected mode, for example because it needs to transmit uplink data or respond to a paging request, by undertaking a random access procedure. The random access procedure involves the terminal device transmitting a preamble on a physical random access channel and so the procedure is commonly referred to as a RACH or PRACH procedure/process.

Thus a conventional way for a terminal device (UE) in the RRC idle mode to exchange data with a network involves the terminal device first performing an RRC connection procedure (random access procedure) with the network. The RRC connection procedure involves the UE initially transmitting a random access request message (which may be triggered autonomously by the UE determining it has data to transmit to the network or in response to the network instructing the UE to connect to the network). This is followed by RRC control message exchange between the network and UE, comprising a "Message 2", or Random Access Response message, a "Message 3", transmitted by the UE and including an RRC message transmitted by the UE requesting the establishment, re-establishment, or resumption of an RRC connection, and a "Message 4" transmitted by the network, comprising an RRC message sent in response to the "Message 3". As will be appreciated, a large number of different possible Message 3 and Message 4 messages can be used as part of a RACH procedure.

After establishing an RRC connection and exchanging the relevant data, the UE may then perform RRC disconnection and move back into idle mode for power saving.

A wireless telecommunications network, such as a 5G (NR) network may support an RRC Inactive (RRC_INACTIVE) mode, in which, as in the RRC idle mode, it may not transmit data, but must transition to the RRC connected mode in order to transmit or receive data. In both the RRC Inactive and RRC Idle modes, mobility (i.e. change of serving cell) is by means of UE-based cell reselection in accordance with parameters transmitted by the wireless telecommunications network. In the RRC connected mode, mobility may be network-controlled; that is, a handover may be initiated by an infrastructure equipment of the network. The handover may be conventionally initiated in response to, for example, measurement reports transmitted by the terminal device, which may indicate the result of measurements of downlink signals transmitted by the network in both the serving cell and one or more neighbour (candidate) cells.

Figure 3:
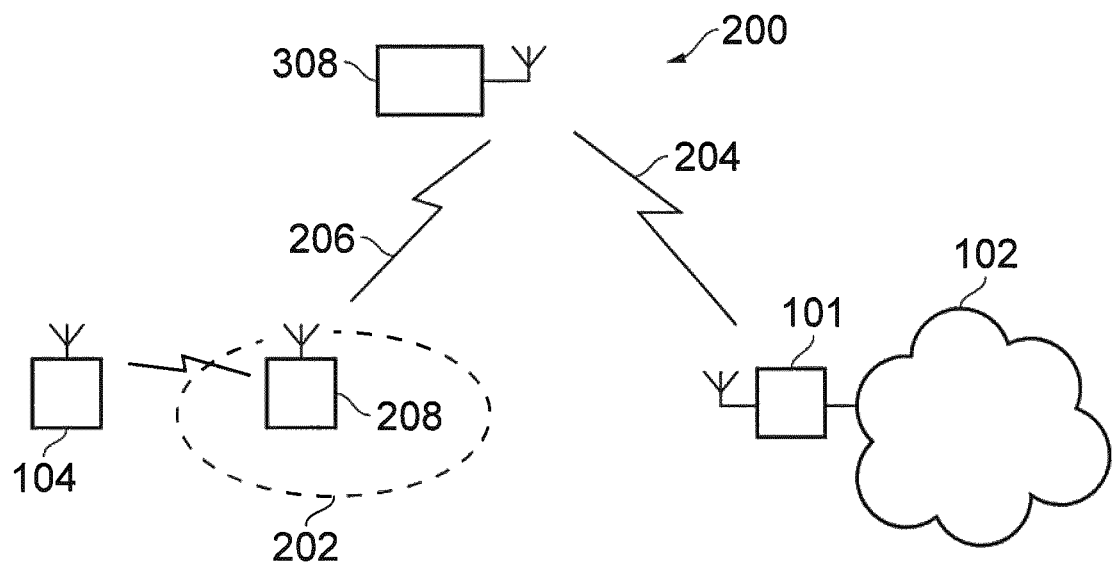
FIG. 3 schematically represents some example aspects of a wireless telecommunication system in accordance with embodiments of the present disclosure.

FIG. 3 schematically shows a wireless telecommunications system 200 according to an example embodiment of the present disclosure. The wireless telecommunications system 200 in this example is based broadly around an LTE-type or 5G-type architecture. Many aspects of the operation of the wireless telecommunications system/network 200 are known and understood and are not described here in detail in the interest of brevity. Operational aspects of the wireless telecommunications system 200 which are not specifically described herein may be implemented in accordance with any known techniques, for example according to the current LTE-standards or the proposed 5G standards.

The wireless telecommunications system 200 comprises a core network part 102 (which may be a 5G core network or a NG core network) coupled to a radio network part. The radio network part comprises a base station (g-node B) 101 coupled to a non-terrestrial network part 308. The non-terrestrial network part 308 may be an example of infrastructure equipment.

The non-terrestrial network part 308 may be mounted on a satellite vehicle or on an airborne vehicle.

The non-terrestrial network part 308 is further coupled to a communications device 208, located within a cell 202, by means of a wireless access interface provided by a wireless communications link 206. For example, the cell 202 may correspond to the coverage area of a spot beam generated by the non-terrestrial network part 308.

The boundary of the cell 202 may depend on an altitude of the non-terrestrial network part 308 and a configuration of one or more antennas of the non-terrestrial network part 308 by which the non-terrestrial network part 308 transmits and receives signals on the wireless access interface.

The non-terrestrial network part 308 may be a satellite in an orbit with respect to the Earth, or may be mounted on such a satellite. For example, the satellite may be in a geo-stationary orbit such that the non-terrestrial network part 308 does not move with respect to a fixed point on the Earth's surface. The geo-stationary orbit may be a circular orbit approximately 36,000 km above the Earth's equator. Alternatively, the satellite may be in a non-geostationary orbit, so that the non-terrestrial network part 308 moves with respect to a fixed point on the Earth's surface.

The non-terrestrial network part 308 may be an airborne vehicle such as an aircraft, or may be mounted on such a vehicle. The airborne vehicle (and hence the non-terrestrial network part 308) may be stationary with respect to the surface of the Earth or may move with respect to the surface of the Earth.

In FIG. 3, the base station 101 is shown as ground-based, and coupled to the non-terrestrial network part 308 by means of a wireless communications link 204. The non-terrestrial network part 308 receives signals representing downlink data transmitted by the base station 101 on the wireless communications link 204 and, based on the received signals, transmits signals representing the downlink data via the wireless communications link 206 providing the wireless access interface for the communications device 208. Similarly, the non-terrestrial network part 308 receives signals representing uplink data transmitted by the communications device 208 via the wireless access interface comprising the wireless communications link 206 and transmits signals representing the uplink data to the base station 101 on the wireless communications link 204.

In some embodiments, the wireless communications links 204, 206 operate at a same frequency; in some embodiments, the wireless communications links 204, 206 operate at different frequencies.

The extent to which the non-terrestrial network part 308 processes the received signals may depend upon a processing capability of the non-terrestrial network part 308. For example, the non-terrestrial network part 308 may receive signals representing the downlink data on the wireless communication link 204, amplify them and (if needed) re-modulate onto an appropriate carrier frequency for onwards transmission on the wireless access interface provided by the wireless communications link 206.

Alternatively, the non-terrestrial network part 308 may be configured to decode the signals representing the downlink data received on the wireless communication link 204 into un-encoded downlink data, re-encode the downlink data and modulate the encoded downlink data onto the appropriate carrier frequency for onwards transmission on the wireless access interface provided by the wireless communications link 206.

In some embodiments, the non-terrestrial network part 308 may be configured to perform some of the functionality conventionally carried out by the base station 101. In particular, latency-sensitive functionality (such as acknowledging a receipt of the uplink data, or responding to a random access channel (RACH) request in accordance with some embodiments of the present technique) may be performed by the non-terrestrial network part 308 instead of by the base station 101.

In some embodiments, the base station 101 may be co-located with the non-terrestrial network part 308; for example, both may be mounted on the same satellite vehicle or airborne vehicle, and there may be a physical (e.g. wired, or fibre optic) connection on board the satellite vehicle or airborne vehicle, providing the coupling between the base station 101 and the non-terrestrial network part 308. In such embodiments, a wireless communications link between the base station 101 and a ground station (not shown) may provide connectivity between the base station 101 and the core network part 102.

The communications device 208 shown in FIG. 3 may be configured to act as a relay node. That is, it may provide connectivity via a wireless access interface to one or more terminal devices such as the terminal device 104. FIG. 3 shows a single terminal device 104, however, in some embodiments of the present technique the communications device 208 may provide relay functionality for a plurality of terminal devices.

The wireless access interface provided by the communications device 208 for the purposes of providing service and connectivity to terminal devices may comply substantially with the standards for a wireless access interface generated by a base station such as the base station 101 in accordance with standards, such as the LTE standard or a 5G standard. Data may thus be transmitted by the terminal device 104 to the communications device 208 and by the communications device 208 to the terminal device 104 in accordance with conventional techniques for transmission of data to a conventional base station or a conventional relay node.

When acting as a relay node, the communications device 208 transmits and receives data to and from the terminal device 104, and relays it, via the non-terrestrial network part 308 to the base station 101. The communications device 208, acting as a relay, may thus provide connectivity to the core network part 102 for terminal devices which are within a transmission range of the communications device 208.

It will be apparent that many scenarios can be envisaged in which the combination of the communications device 208 and the non-terrestrial network part 308 can provide enhanced service to end users. For example, the communications device 208 may be mounted on a passenger vehicle such as a bus or train which travels through rural areas where coverage by terrestrial base stations may be limited. Terminal devices on the vehicle may obtain service via the communications device 208 acting as a relay, which is coupled to the non-terrestrial network part 308.

Due to the use of the non-terrestrial network part 308, which may be physically distant from one or both of the communications device 208 and the base station 101, there is a need to provide for improved data transmission in light of the propagation delay incurred on each of the wireless communications links 206, 204 between the communications device 208 and the non-terrestrial network part 308, and between the non-terrestrial network part 308 and the base station 101, which may be substantially greater than the corresponding delays in a terrestrial communications network (e.g. where the communications device 208 communicates directly with the base station 101, or does so only via terrestrial network elements).

According to embodiments of the present disclosure, there is provided a method for transmitting data by a communications device acting as a relay node for one or more terminal devices in a wireless telecommunications network, the wireless telecommunications network comprising a base station and a non-terrestrial network part. The method comprises determining that data is to be transmitted by the communications device to the base station via the non-terrestrial part and, in response to the determining, selecting a random access preamble from a group of random access preambles, each of the random access preambles of the group being associated with one or more resource pools of communications resources for transmitting data, and transmitting the selected random access preamble. The method further comprises receiving a random access response transmitted by the base station in response to the transmission of the selected random access preamble, the random access response indicating an identity of an activated resource pool, the activated resource pool being one of the one or more resource pools of communications resources for the transmission of the data to the base station via the non-terrestrial network part, and transmitting at least a portion of the data using the communications resources of the activated resource pool.

Figure 4:
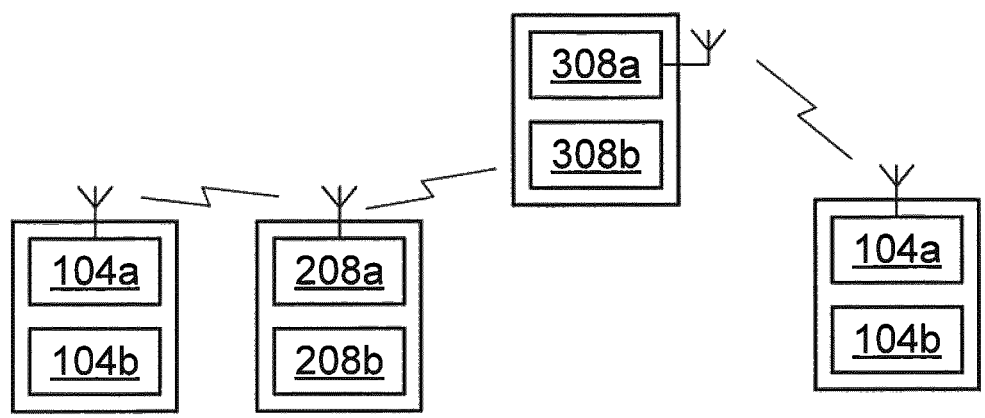
FIG. 4 schematically represents further example aspects of a wireless telecommunication system in accordance with embodiments of the present disclosure.

FIG. 4 schematically represents further aspects of a wireless telecommunication system in accordance with example embodiments of the present disclosure.

The base station 101 comprises transceiver circuitry 101a (which may also be referred to as a transceiver/transceiver unit) for transmission and reception of wireless signals and processor circuitry 101b (which may also be referred to as a processor/processor unit) configured to control the base station 101 to operate in accordance with embodiments of the present disclosure as described herein. The processor circuitry 101b may comprise various sub-units/sub-circuits for providing desired functionality as explained further herein. These sub-units may be implemented as discrete hardware elements or as appropriately configured functions of the processor circuitry. Thus the processor circuitry 101b may comprise circuitry which is suitably configured/programmed to provide the desired functionality described herein using conventional programming/configuration techniques for equipment in wireless telecommunications systems. The transceiver circuitry 101a and the processor circuitry 101b are schematically shown in FIG. 4 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the base station 101 will in general comprise various other elements associated with its operating functionality.

The non-terrestrial network part 308 comprises transceiver circuitry 308a (which may also be referred to as a transceiver/transceiver unit) for transmission and reception of wireless signals and processor circuitry 308b (which may also be referred to as a processor/processor unit) configured to control the non-terrestrial network part 308. The processor circuitry 308b may comprise various sub-units/sub-circuits for providing functionality as explained further herein. These sub-units may be implemented as discrete hardware elements or as appropriately configured functions of the processor circuitry. Thus the processor circuitry 308b may comprise circuitry which is suitably configured/programmed to provide the desired functionality using conventional programming/configuration techniques for equipment in wireless telecommunications systems. The transceiver circuitry 308a and the processor circuitry 308b are schematically shown in FIG. 4 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). As will be appreciated the non-terrestrial network part 308 will in general comprise various other elements associated with its operating functionality.

The communications device 208 comprises transceiver circuitry 208a (which may also be referred to as a transceiver/transceiver unit) for transmission and reception of wireless signals. The communications device 208 is configured to provide connectivity via the non-terrestrial network part 308. For example, the transceiver circuitry 208b may be adapted in accordance with the nature of the communications channel to the non-terrestrial network part 308, which may be characterized by a high path loss and an absence of multipath.

The communications device 208 further comprises processor circuitry 208b (which may also be referred to as a processor/processor unit) configured to control the communications device 208. The processor circuitry 208b may comprise various sub-units/sub-circuits for providing functionality as explained further herein. These sub-units may be implemented as discrete hardware elements or as appropriately configured functions of the processor circuitry. Thus the processor circuitry 208b may comprise circuitry which is suitably configured/programmed to provide the desired functionality using conventional programming/configuration techniques for equipment in wireless telecommunications systems. The transceiver circuitry 208a and the processor circuitry 208b are schematically shown in FIG. 4 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). As will be appreciated the communications device 208 will in general comprise various other elements associated with its operating functionality.

The terminal device 104 comprises transceiver circuitry 104a (which may also be referred to as a transceiver/transceiver unit) for transmission and reception of wireless signals. The terminal device 104 further comprises processor circuitry 104b (which may also be referred to as a processor/processor unit) configured to control the terminal device 104. The processor circuitry 104b may comprise various sub-units/sub-circuits for providing functionality as explained further herein. These sub-units may be implemented as discrete hardware elements or as appropriately configured functions of the processor circuitry. Thus the processor circuitry 104b may comprise circuitry which is suitably configured/programmed to provide the desired functionality using conventional programming/configuration techniques for equipment in wireless telecommunications systems. The transceiver circuitry 104a and the processor circuitry 104b are schematically shown in FIG. 4 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). As will be appreciated the terminal device 104 will in general comprise various other elements associated with its operating functionality.

It will be appreciated that in practice the radio network part may comprise a plurality of base stations and non-terrestrial network parts serving a larger number of communications devices and terminal devices across various communication cells. However, only a single base station, single non-terrestrial network part, single communications device single terminal device are shown in FIG. 3 and FIG. 4 in the interests of simplicity.

As with a conventional mobile radio network, the terminal device 104 is arranged to communicate data to and from the base station (transceiver station) 101. The base station 101 is in turn communicatively connected to a serving gateway, S-GW, (not shown) in the core network part 102 which is arranged to perform routing and management of mobile communications services to the terminal devices in the wireless telecommunications system 200 via the base station 101. In order to maintain mobility management and connectivity, the core network part 102 also includes a mobility management entity (not shown) which manages the enhanced packet service (EPS) connections with the terminal device 104 operating in the communications system based on subscriber information stored in a home subscriber server (HSS). Other network components in the core network (also not shown for simplicity) include a policy charging and resource function (PCRF) and a packet data network gateway (PDN-GW) which provides a connection from the core network part 102 to an external packet data network, for example the Internet. As noted above, the operation of the various elements of the wireless telecommunications system 200 shown in FIG. 3 may be broadly conventional apart from where modified to provide functionality in accordance with embodiments of the present disclosure as discussed herein.

According to embodiments of the present technique, communications resources of the wireless access interface provided by the wireless communications link 206 may form a resource pool. The communications resources making up a resource pool may be characterised by one or more time periods, one or more frequency ranges (which may comprise one or more frequency-multiplexed sub-carriers), and/or one or more codes. The communications resources of a resource pool may repeat in time.

Figure 5:
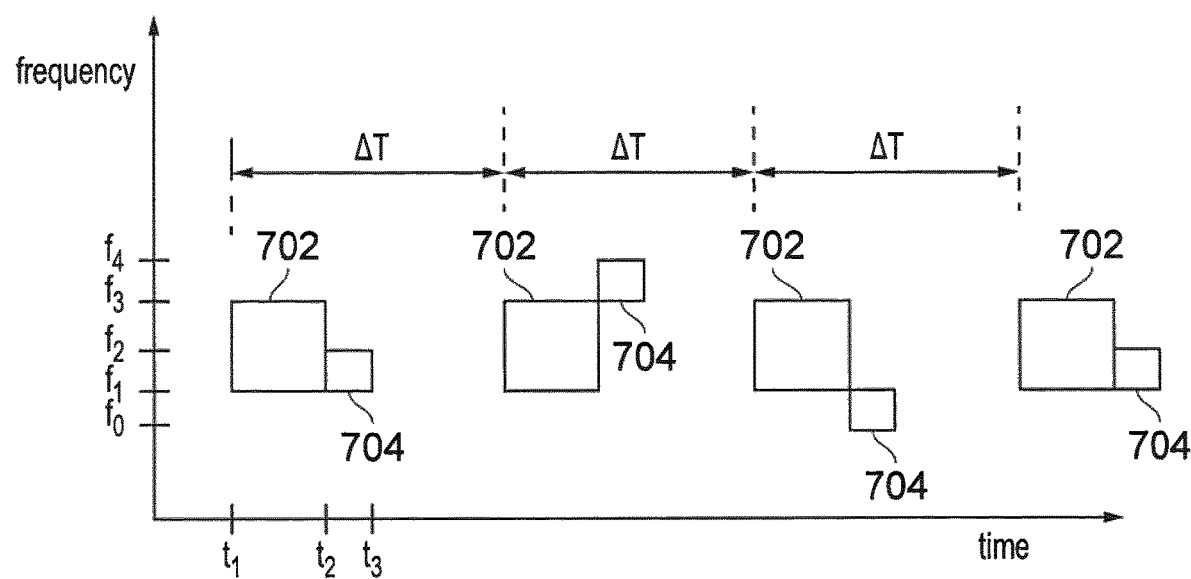
FIG. 5 graphically represents communications resources of a wireless access interface and resource pools formed from the communications resources in accordance with embodiments of the present disclosure.

FIG. 5 illustrates two example resource pools, a first resource pool 702 and a second resource pool 704. The first resource pool 702 comprises communications resources within the frequency range f1 to f3 and during time periods $t1+n.\Delta T$ to $t2+n.\Delta T$, for n=0, 1, 2, 3, . . . .

The second resource pool 704 comprises communications resources which hop in the frequency domain over time. The second resource pool 704 comprises resources during time periods $t2+n.\Delta T$ to $t3+n.\Delta T$, for n=0, 1, 2, 3, . . . . During time periods when n mod3=0, the second resource pool 704 comprises resources within the frequency range f1 to f2; during time periods when n mod 3=1, the second resource pool 704 comprises resources within the frequency range f3 to f4, and during time periods when n mod 3=2, the second resource pool 704 comprises resources within the frequency range f0 to f1.

In the example shown in FIG. 5, the communications resources associated with the first resource pool 702 are greater than those associated with the second resource pool 704, and as such may provide the possibility to transmit a greater quantity of data than would be possible using the second resource pool 704. However, the second resource pool 704, which makes use of frequency diversity by means of a frequency hopping pattern, may provide more robust data transmission, albeit for a smaller quantity of data.

FIG. 5 illustrates two resource pools; however, it will be appreciated that the present disclosure is not so limited, and any number of resource pools may be configured, in any appropriate manner, in accordance with the present technique.

Figure 6:
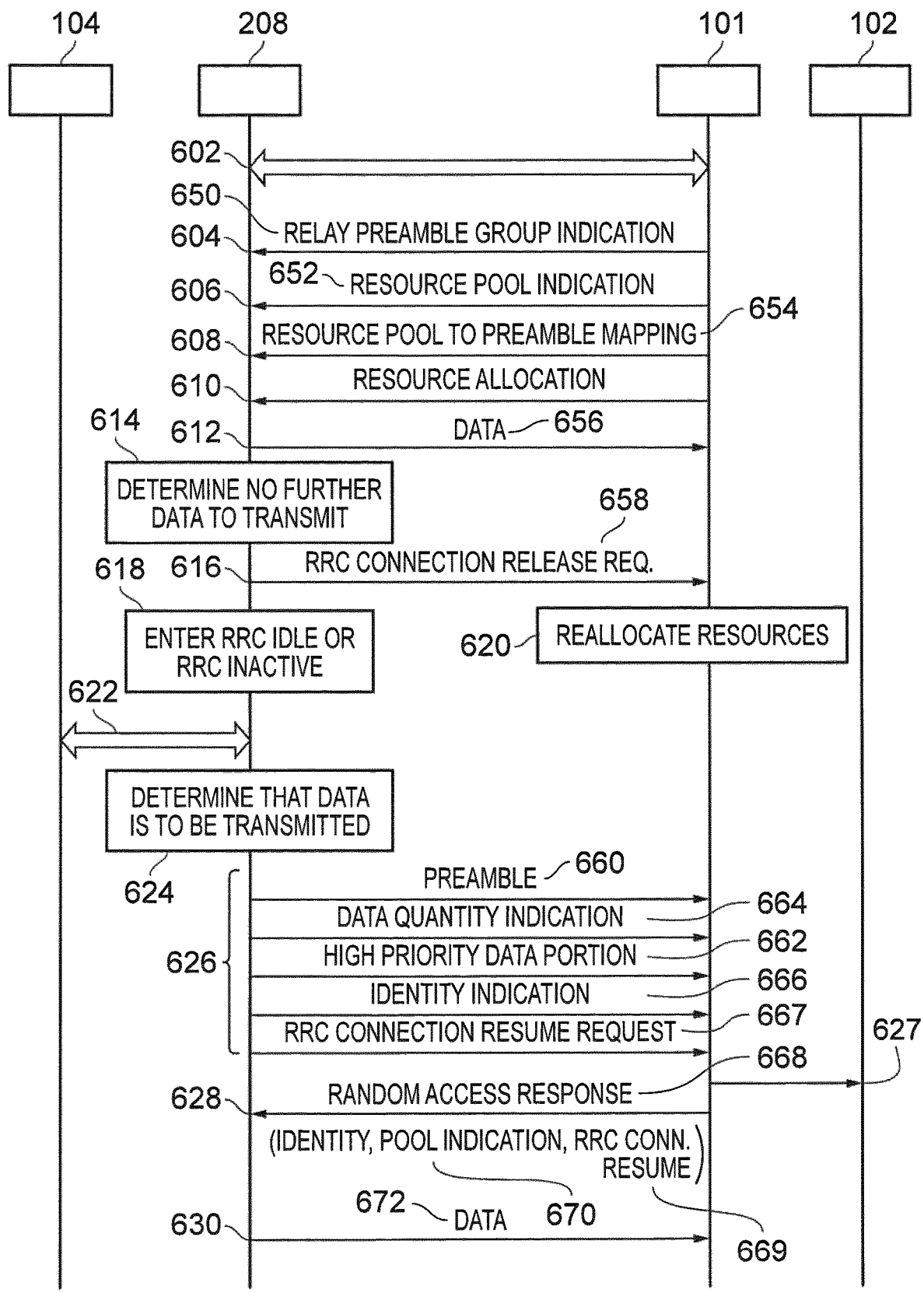
FIG. 6 illustrates a message sequence diagram illustrating message transmissions and associated processes in accordance with embodiments of the present technique.

FIG. 6 illustrates a message sequence diagram illustrating message transmissions and associated processes in accordance with embodiments of the present technique, in the context of the example architecture illustrated in FIG. 3 and described above. FIG. 6 may correspond to the message sequence resulting from the communications device 208 operating in accordance with the process illustrated in FIG. 7 and described below, and the base station 101 operating in accordance with the process illustrated in FIG. 8 and described below.

In FIG. 6, transmissions between the communications device 208 and the base station 101 are shown. However, as will be appreciated from the architecture of FIG. 3, these transmissions may be transmitted from the base station 101 to the non-terrestrial network part 308 via the wireless communications link 204, and may be relayed by the non-terrestrial network part 308 to the communications device 208 via the wireless communications link 206, and vice versa.

For conciseness, the non-terrestrial network part 308 is not shown in FIG. 5, although it will be appreciated that the non-terrestrial network part 308 may provide at least a relaying functionality for transmissions between the communications device 208 and the base station 101, as described above.

The process starts at step 602, in which an RRC connection is established between the communications device 208 and the base station 101. The RRC connection may be established in response to paging of the communications device 208 by the base station 101, in response to a determination by the communications device 208 that it has uplink data for transmission to the base station 101, or for any other reason.

At step 604, the base station 101 transmits to the communications device 208 a relay preamble group indication 650, providing an indication of one or more preambles for use on a random access channel which are allocated for the use of communications devices, such as the communications device 208, which are acting as (or capable of acting as, or configured to act as) relay nodes for one or more further communications devices (such as the terminal device 104).

At step 606, the base station 101 transmits to the communications device 208 a resource pool indication 652. The resource pool indication 652 indicates, for one or more resource pools, an identifier for the pool and a description of the communications resources which make up the pool. For example, the resource pool indication 652 may comprise a description of the first resource pool 702 and the second resource pool 704 and respective identities for each.

At step 608, the base station 101 transmits to the communications device 208 a resource pool to preamble mapping indication 654. The resource pool to preamble mapping indication 654 comprises an indication of one or more RACH preambles and, for each RACH preamble, an associated resource pool. For example, the resource pool to preamble mapping indication 654 may indicate that a first RACH preamble is associated with the first resource pool 702, and a second RACH preamble is associated with the second resource pool 704.

During the RRC connection established at step 602, for example at step 610, the communications device 208 may be allocated communications resources for uplink transmission of data to the base station 101. The allocated communications resource may comprise communications resources within a resource pool, such as the first resource pool 702.

In response to this allocation, the communications device 208 may at step 612 transmit data 656 to the base station 101 using the allocated communications resources within the first resource pool 702.

Subsequent to the transmission of the data 656 at step 612, then at step 614, the communications device 208 determines that it does not have any further data for uplink transmission. In response to this determination, the communications device 208 indicates this to the base station 101 at step 616. This indication may comprise a request 658 to release or suspend the RRC connection.

The base station 101 may acknowledge the request 658 (not shown). At step 618 the communications device 208 may In response to an acknowledgement of the request 658 (or in any case) enter the RRC Inactive mode or RRC Idle mode.

In response to the indication (e.g. the request 658) transmitted by the communications device 208 at step 616, which is received by the base station 101, the base station 101 may subsequently allocate or activate at step 620 (for example, in a manner described below) the communications resources of the first resource pool 702 for the uplink transmission of data by another communications device (not shown in FIG. 6).

Subsequently, the communications device 208 may determine at step 624 that it is required to transmit further data. This determination may be in response to, for example, receiving communications (which may comprise some or all of the data to be transmitted) transmitted by the terminal device 104, for example during an RRC connection established at step 622. The further data to be transmitted may comprise the high priority data portion 662 and the uplink data 672 described below.

In response to the determination at step 624, the communications device 208 selects a random access preamble 660 for transmission on the RACH. The selected random access preamble may indicate that the device transmitting the selected random access preamble (i.e. the communications device 208) is acting as a relay device and/or may indicate the first resource pool 702, being the resource pool most recently used by the device transmitting the selected random access preamble for the transmission of uplink data. The selection of the selected random access preamble 660 is described in more detail below in the context of the process illustrated in FIG. 7.

As part of the step 624, the communications device may determine an amount of the data which it is to transmit. This determination may be broadly similar to the generation of a conventional buffer status report.

The communications device 208 may additionally select a high priority data portion 662 from the data to be transmitted, the high priority data portion 662 to be transmitted with the selected random access preamble 660. This selection may be based on a first-in-first-out selection from a buffer, or on quality of service attributes or requirements associated with the data. For example, data having a very low latency requirement may be selected as the high priority data portion 662. The quantity of data forming the high priority data portion 662 may be limited to not exceed a predetermined quantity, for example in accordance with a preconfigured parameter.

The communications device 208 may thus transmit at step 626 the selected random access preamble 660 on the RACH. In addition, the communications device 208 may transmit one or more of a data quantity indication 664 reflecting the quantity of data determined at step 624, the high priority data portion 662, and an identity indication 666 indicating an identity of the communications device 208. In the example illustrated in FIG. 6, each of these are shown as being transmitted; however, in some embodiments, one or more of the data quantity indication 664, the high priority data portion 662, and the identity indication 666 may not be sent.

The data quantity indication 664 may comprise a buffer status report, which may be formed according to conventional techniques. The communications device 208 may further transmit in step 626 a request 667 to resume or establish an RRC connection. In some embodiments, the RACH preamble (comprising the selected random access preamble 660) may itself (or together with one or more of the data quantity indication 664 and the identity indication 666) constitute the RRC Connection Request 667.

In the example shown in FIG. 6, the RRC message sent at step 626 is an RRC Connection Resume Request message. However, in some embodiments, the RRC message may be an RRC Connection Request message or any other conventional "Message 3" message of a conventional 4-step RACH procedure.

All of the transmissions of step 626 may be substantially simultaneous (e.g. during a same transmission time interval), and two or more may be combined. The selected random access preamble 660 may be transmitted on a random access channel. The data quantity indication 664, the high priority data portion 662, and the identity indication 666 may be transmitted as part of a single message, for example on communications resources pre-configured for a transmission of information associated with a transmission using the communications resources of the physical random access channel (PRACH) on which the selected random access preamble 660 is transmitted.

The identity indicated by the identity indication 666 may be unique amongst all devices within the wireless communications network, or may be unique only within a limited logical or physical portion of the network; for example, the identity may be unique only amongst devices currently served by the base station 101 or devices currently served by the non-terrestrial network part 308, or devices currently served within a cell (such as the cell 202) formed by a spot-beam transmitted by the non-terrestrial network part 308.

In any case, the identity indicated by the identity indication 666 is sufficiently unique to permit contention resolution; that is, that when the same identity is indicated in a response to the transmission of the selected random access preamble 660 and identity indication 666, the communications device 208 is assured that the response has been transmitted in response to its transmission, and not in response to a different transmission by another communications device.

In response to receiving the selected random access preamble 660, the base station 101 is able to determine that the communications device 208 is acting as a relay, and that the most recently used communications resources used by the communications device 208 for uplink data transmissions were communications resources within the first resource pool 702.

In response to receiving the high priority data portion 662, the base station 101 may forward at step 627 the data contained therein to the core network 102. The high priority data portion 662 may contain address information or routing information, such as an indication of a destination address, to allow the core network 102 to forward the high priority data portion 662 towards an intended destination or recipient associated with the high priority data portion 662.

Based on one or more of the selected random access preamble 660 (which may indicate the first resource pool 702 and/or the fact that the communications device 208 is acting as a relay), identity indication 666 and the data quantity indication 664, the base station 101 may select communications resources to be activated for the transmission of the uplink data by the communications device 208. These communications resources may belong to the same resource pool as that indicated by the selected random access preamble 660 (i.e. the first resource pool 702) or to a different resource pool, e.g. the second resource pool 704.

The base station 101 may respond to the receipt of the selected random access preamble 660 by transmitting a random access response message 668 at step 628 to the communications device 208. The random access response message 668 may comprise an indication of the identity indicated by the identity indication 666, and an activated resource pool indication 670, identifying the activated resource pool. The random access response message 668 may further comprise an RRC connection resume—message or any other message 4 contained within the conventional 4-step RACH procedure. 669.

The communications device 208, receiving the random access response message 668, may determine that the random access response message 668 was transmitted in response to the transmissions by the communications device 208 at step 626.

The communications device 208 may further determine the identity of the activated resource pool and, based on the resource pool indication 652 received at step 606, the communications resources associated with the activated resource pool.

If the random access response message 668 comprises the RRC connection resume indication 669 then the communications device 208 may enter the RRC connected mode.

At step 630, the communications device 208 may transmit the uplink data 672 using the communications resources of the activated resource pool.

Figure 7:
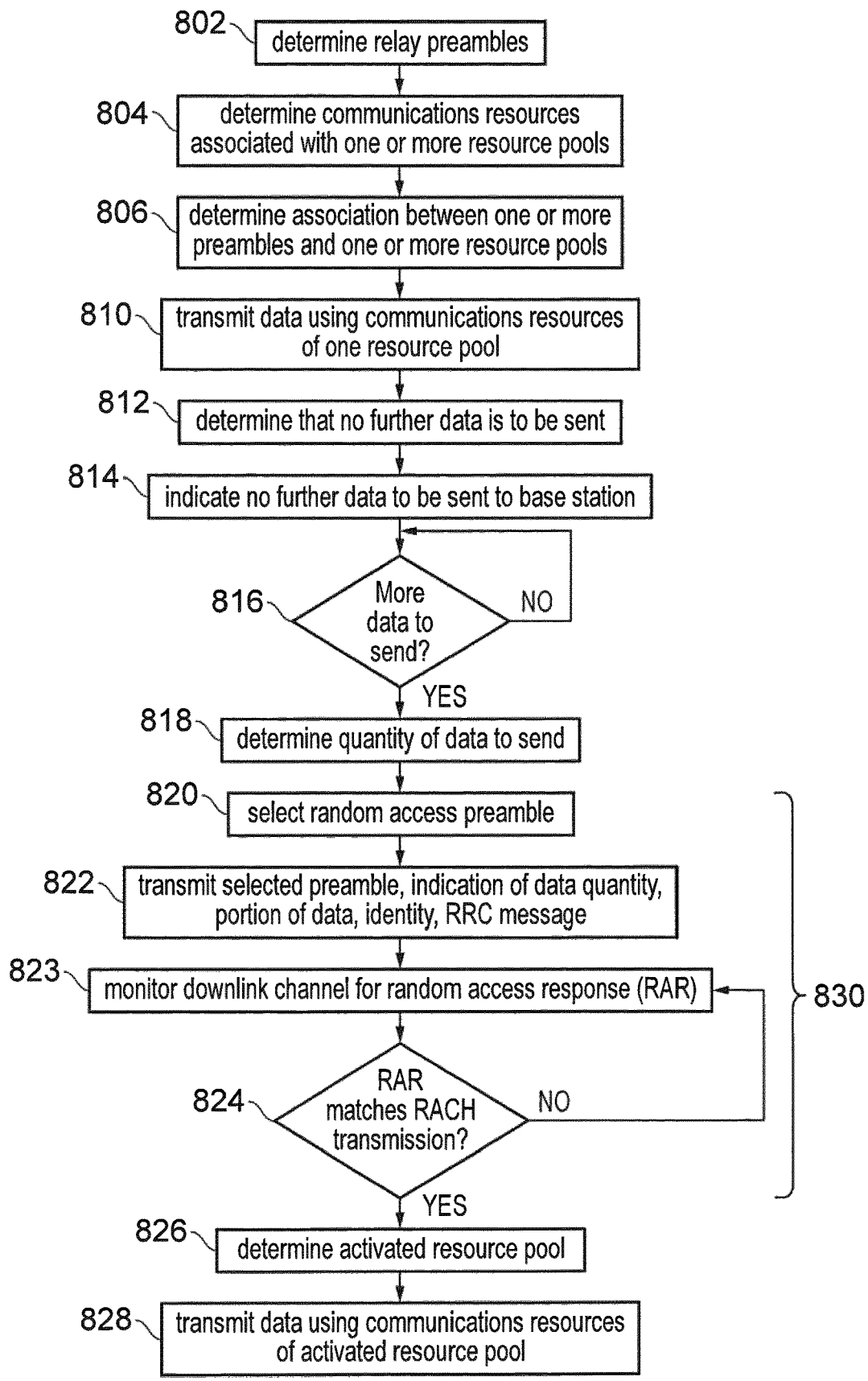
FIG. 7 is a process flow chart illustrating a process for a communications device in accordance with example embodiments of the present technique.

FIG. 7 is a process flow chart illustrating a process for the communications device 208 in accordance with example embodiments of the present technique.

As will be described, the process of FIG. 7 may result in the behaviour of the communications device 208 illustrated in the message sequence illustrated in FIG. 6. The communications device 208 illustrated in FIG. 6 acts as a relay node, that is, it provides a wireless access interface by which terminal devices, such as the terminal device 104 may transmit and receive data to and from the communications device 208.

In some embodiments, the communications device 208 acts as a relay node. However, in some embodiments, the process of FIG. 7 may be carried out by a communications device which does not act as a relay node.

At step 802, the communications device 208 determines one or more relay preambles for use on a random access channel which are allocated for the use of communications devices, such as the communications device 208, which are acting as relay nodes for one or more further communications devices (such as the terminal device 104). The relay preambles may be allocated for the use of communications devices which are acting as relay nodes when communicating with a base station (such as the base station 101) via a non-terrestrial network part (such as the non-terrestrial network part 308). The relay preambles may be those preambles which are permitted for use only by a certain category or categories of communications devices, the category or categories including communications devices acting as relays when communicating via a non-terrestrial network part.

The relay preambles may be permitted for use by communications devices which are capable of acting as relays, whether or not the uplink data triggering a corresponding random access request transmission originates at the communications device acting as a relay (and transmitting the random access request) or at a communications device (such as the terminal device 104) other than the communications device transmitting the random access request.

In some embodiments, the relay preambles may be permitted for use only by communications devices acting as relays, when the uplink data triggering the corresponding random access request transmission originates at a communications device other than the communications device transmitting the random access request; in other words, the relay preambles may be restricted to use when uplink data is being relayed.

At step 804, the communications device 208 determines, for each of one or more resource pools such as the first resource pool 702 and the second resource pool 704, an identifier for the pool and the communications resources which make up the pool.

At step 806, the communications device 208 determines a resource pool to preamble mapping comprising an indication of one or more RACH preambles and, for each RACH preamble, one or more associated resource pools. The resource pools may be identified by means of the identifiers determined at step 804. Some or all of the RACH preambles determined to be associated with resource pools may be in the group of relay preambles determined at step 802. In some embodiments, each RACH preamble is associated with at most one resource pool. In some other embodiments, each RACH preamble may be associated with multiple resource pools; preferably, the multiple resource pools having the same associated RACH preamble share (or have substantially similar) one or more characteristics, such as an amount of communications resources provided per time.

Steps 802, 804, and 806 may be realised by the communications device 208 receiving, respectively, the relay preamble group indication 650, the resource pool indication 652, and the resource pool to preamble mapping indication 654, for example as illustrated in steps 602, 604 and 606 as described above. However, one or more of steps 802, 804, and 806 may be comprise receipt of broadcast system information or determination of pre-configured parameters (for example, in compliance with a standards specification).

For example, one or more of the relay preamble group indication 650, the resource pool indication 652 and 654 may be included within broadcast system information transmissions, transmitted by the base station 101 and received by the communications device 208 while the communications device is in the RRC Idle mode or the RRC Inactive mode.

Two or more of the relay preamble group indication 650, the resource pool indication 652 and the resource pool to preamble mapping indication 654 may be combined within a single transmission, and one or more of the relay preamble group indication 650, the resource pool indication 652 and the resource pool to preamble mapping indication 654 may be implicit; for example, the relay preamble group indication 650 may comprise the set of preambles which are indicated as being associated with a resource pool in the resource pool to preamble mapping indication 654.

In some embodiments of the present technique one or more of steps 802, 804 and 806 may be omitted, and the order in which the steps are performed (relative to each other, and to other steps) may be different from that described above and illustrated in FIG. 7.

At step 810, the communications device 208 transmits uplink data (such as the uplink data 656) using communications resources within one of the resource pools, for example, within the first resource pool 702. The transmission may be, for example, during an ongoing RRC Connection. The transmission may be on communications resources which have been allocated exclusively (i.e. 'granted') to the communications device 208. Step 810 may correspond to step 612 of the process of FIG. 6. The uplink data may be uplink data which has been transmitted by the terminal device 104 and received by the communications device 208, so that the communications device 208 is acting as a relay node.

In some embodiments, the uplink transmission in step 810 may be 'grant-free'. Such 'grant-free' transmissions may be contention-based—that is, the transmissions may use resources which have not been exclusively allocated (or 'granted') to the communications device 208, but may be used by other communications devices for uplink data transmission and may result in collisions in which multiple communications devices transmit simultaneously using the same communications resources.

In some embodiments (such as, for example, when the data 656 is transmitted using communications resources which have not been explicitly allocated) the data 656 may be transmitted when the communications device is in the RRC Inactive state and not in the RRC Connected state.

At step 812, the communications device 208 determines that it has no further data to transmit, and at step 814 indicates this to the base station 101 accordingly. Steps 812 and 814 may correspond to steps 614 and 616 respectively of the process of FIG. 6. The indication at step 814 may be explicit (for example, it may comprise a request to suspend or release an ongoing RRC connection), or may be implicit—for example, it may comprise an earlier transmission of an indication of an amount of data to be sent, followed by the transmission of the indicated amount of data.

In some embodiments, following step 814, the communications device 208 may change RRC state; for example, from the RRC connected mode to either the RRC Inactive mode or the RRC Idle mode. The change of RRC state may be in response to the receipt of an acknowledgement transmitted by the base station 101 in response to the indication transmitted at step 814 by the communications device 208.

Following step 814 (and any RRC state change, if applicable), the communications device 208 evaluates at step 816 whether it has additional uplink data to transmit. If it does not, then the process continues by repeating step 816.

The communications device 208 may determine that it has additional uplink data to transmit in response to receiving data from the terminal device 104.

If, at step 816, the communications device 208 determines that it has further data to transmit, then it initiates a random access procedure 830. The random access procedure 830 may correspond broadly to steps 626 and 628 of the process illustrated in FIG. 6.

The random access procedure 830 comprises step 820, in which the communications device 208 selects the random access preamble 660, step 822, in which the communications device 208 transmits the selected random access preamble 660 together with additional indications to the base station 101, step 823 in which the communications device 208 monitors a downlink channel for a random access response (RAR) message and step 824, in which the communications device 208 determines whether the random access response message 668 from the base station 101 is in response to the transmitted selected random access preamble 660.

The random access procedure 830 will now be described in further detail.

At step 818, the communications device 208 may determine a quantity of data to transmit. This may be as described in respect of step 624 of the process of FIG. 6. Alternatively or additionally, the determination may be based on, for example, an indication of an amount of data which it expects to receive from the terminal device 104, an indication of an amount of data received from upper layers of its protocol stack (e.g. from an application running on the communications device 208 or from a routing protocol operating at a higher protocol level), an amount of data already received from the terminal device 104, and/or any other indication (including from other terminal devices not shown).

In embodiments in which step 802 is carried out, then at step 820 the selected random access preamble 660 is selected by the communications device 208 from the one or more relay preambles determined at step 802 (e.g. those preambles allocated for the use of communications devices which are acting as relay nodes for one or more further communications devices).

If the requirements associated with the relay preambles determined at step 802 are met (e.g. because the communications device 208 is acting as a relay) then it selects the selected random access preamble 660 from the relay preambles determined at step 802 (e.g. as indicated in the relay preamble group indication 650).

In embodiments in which step 806 is carried out, then at step 820 the selected random access preamble 660 is selected by the communications device 208 from preambles determined at step 806 to be associated with the resource pool used for the transmission of the uplink data at step 810.

For example, based on the fact that the most recent uplink data transmissions (at step 810) used communications resources associated with the first resource pool 702, the communications device 208 may select as the selected random access preamble 660 a preamble associated with the first resource pool 702, as indicated by the resource pool to preamble mapping indication 654.

Where multiple preambles meet the applicable criteria (of being associated with the most recently used resource pool and/or of being reserved for devices which act as relays) the communications device 208 selects one of these preambles as the selected random access preamble 660, for example, selecting randomly from among the multiple preambles meeting the criteria.

If no preamble meets the applicable criteria, then the random access process 830 may follow conventional random access techniques.

At step 822 (which may broadly follow the approach described for step 626 of the process of FIG. 6), the selected random access preamble 660 is transmitted to the base station 101 by the communications device 208. The selected random access preamble 660 may be transmitted on a random access channel (RACH).

Together (e.g. substantially at the same time, such as during the same transmission time interval), the communications device 208 may transmit none, one or more of:
- an indication of the determined quantity of data to transmit, such as the data quantity indication 664;
- an indication of an identification of the communications device 208, such as the identity indication 666;
- an RRC message, such as an RRC Connection Resume Request message, or an RRC Connection Establish Request message, such as the RRC connection request 667; and
- a portion of data, such as the high priority data portion 662.

In some embodiments, the portion of data may comprise the RRC message or may comprise other signalling or control plane data transmitted in accordance with a protocol which may terminate within either the base station 101 or within the core network 102.

Following step 822, then at step 823, the communications device 208 monitors a downlink channel for a random access response message transmitted in response to the selected random access preamble 660 transmitted in step 822.

If a random access response message is received (which may be the random access response 668), the communications device 208 determines at step 824 whether or not it corresponds to (i.e. is in response to) the transmission of the selected random access preamble 660. This may be based on one or more indications in the random access response indicating one or more properties of the random access preamble (and/or other associated transmissions) to which the random access response is transmitted in response to. For example, the random access response may indicate a transmission time of the random access preamble, a value of the preamble (i.e. preamble sequence), an identity, and/or an RRC message.

The communications device 208 may thus determine, by comparing the indications included in the random access response message with the respective characteristics of the indications transmitted in step 822. For example, the communications device 208 may determine that the random access response 668 is in response to the transmissions in step 626 if the identity indicated in the random access response 668 matches that indicated by the identity indication 666 and the preamble indicated in the random access response 668 matches the selected random access preamble 660.

If the received random access response message 668 is determined to not correspond to the random access request transmission at step 626 or step 822, then steps 823 and 824 are repeated.

Steps 823 and 824 may be repeated for a limited duration in accordance with determined parameters associated with the random access procedure 830. For example, the communications device 208 may cease performing step 823 if it determines that, had the base station 101 transmitted a response to the random access request (step 626, 822), then the communications device 208 would have already received such a response, even if the base station 101 had delayed the response by a maximum permitted time in accordance with the parameters.

Step 823 may be first initiated only after a delay, in accordance with determined parameters associated with the random access procedure 830.

The parameters associated with the random access procedure may define a time window during which a response to a random access request may be received. The parameters may be applicable specifically where the communications device 208 is served by a base station (such as the base station 101) via a non-terrestrial network part, reflecting the high round-trip time associated with communications via a non-terrestrial network part (compared with a purely terrestrial network).

In response to determining at step 824 that the received random access response 668 is transmitted in response to the transmissions at step 626 (or step 810), then the process continues with step 826.

At step 826, the communications device 208 determines an activated resource pool, which may be the first resource pool 702 or the second resource pool 704. The activated resource pool is determined based on an indication contained within the random access response 668. The communications resources of the activated resource pool may be determined based on the determination at step 804, e.g. based on the resource pool indication 652 received at step 606 of the process of FIG. 6. In response to determining the communications resources of the activated resource pool at step 826, then at step 828 the communications device 208 may transmit data, such as the uplink data 672 using the determined communications resources. The uplink data 672 may be transmitted in a 'grant-free' manner, that is, without a further indication received from the base station 101 that any or all of the communications resources of the activated resource pool are allocated exclusively for the transmission of the uplink data 672 (or any other uplink data) by the communications device 208. The communications resources of the activated resource pool may be exclusively for the use of a single communications device (such as the communications device 208); in other words, at any given time, the activated resource pool may be 'activated' in respect of at most one single communications device. In some embodiments, the activated resource pool may be simultaneously 'activated' in respect of multiple communications devices, such that two or more communications devices may (potentially or in fact) transmit uplink data using the same communications resources of the activated resource pool.

After transmitting the uplink data 672, the communications device 208 may enter the RRC Idle mode or the RRC Inactive mode (not shown in FIG. 6). The activated resource pool may, in response, then be 'deactivated' if it is not activated in respect of any other communications device.

In some embodiments, step 818 may be omitted, and no data quantity indication 664 may be transmitted as part of the random access procedure 830.

Additionally or alternatively, one or more other steps in FIG. 7 may be omitted in some embodiments.

Figure 8:
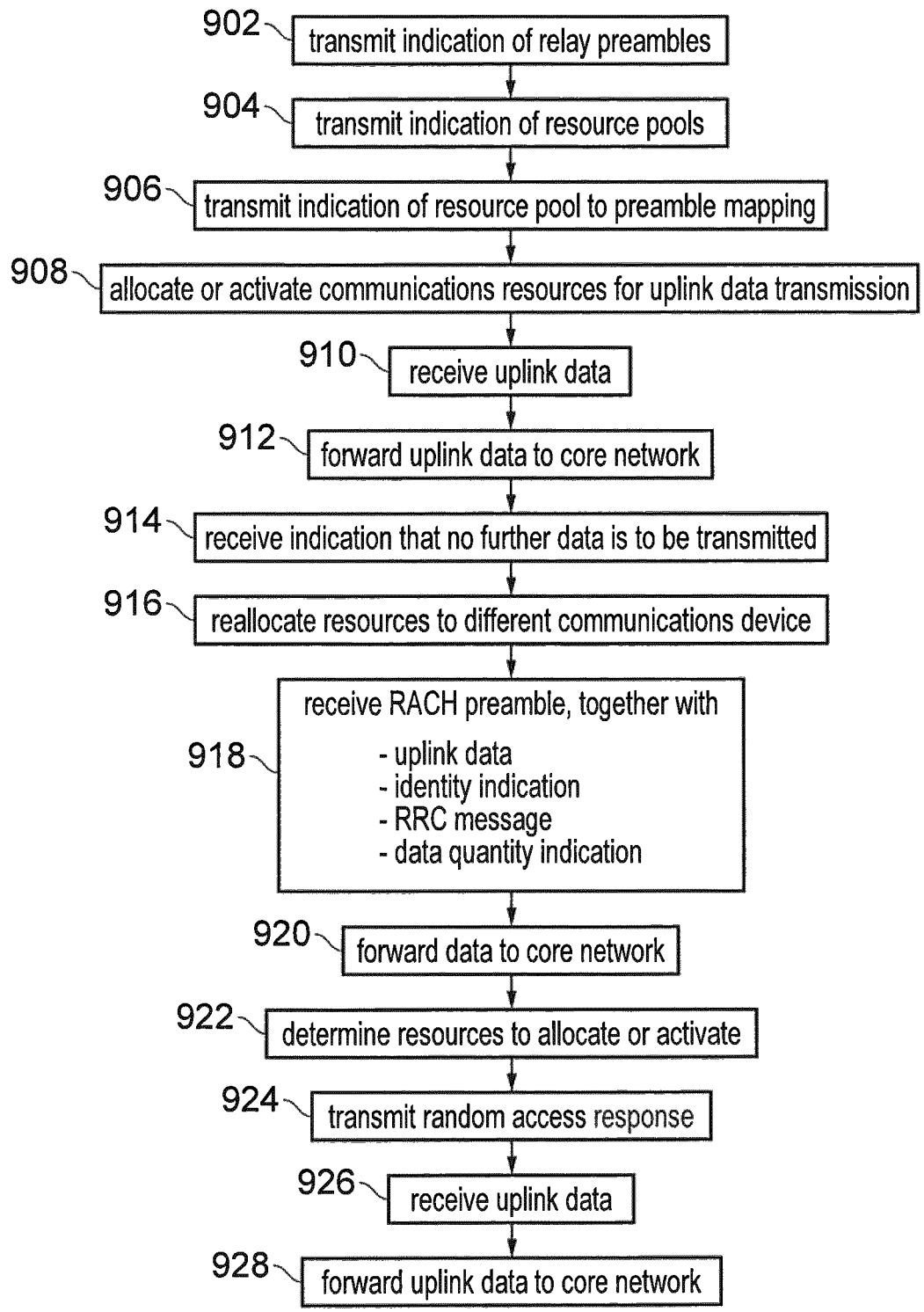
FIG. 8 is a process flow chart illustrating a process for infrastructure equipment in accordance with example embodiments of the present technique.

FIG. 8 is a process flow chart illustrating a process for infrastructure equipment in accordance with example embodiments of the present technique. The infrastructure equipment may be the base station 101, as in the example message sequence chart of FIG. 6. In some embodiments some or all of the steps of the process of FIG. 8 may be carried out by the non-terrestrial network part 308, and as such the infrastructure equipment may comprise the non-terrestrial network part 308.

As will be described, the process of FIG. 8 may result in the behaviour of the base station 101 in the message sequence illustrated in FIG. 6.

Steps 902, 904 and 906 comprise the transmission of, respectively, the relay preamble group indication 650, the resource pool indication 652 and the resource pool to preamble mapping indication 654, as have already been described above.

In some embodiments, for example where the communications device 208 is capable of performing one or more of the steps 802, 804 and 806 of FIG. 7 without reference to or reliance on an indication transmitted by the base station 101, one or more of the steps 902, 904 and 906 in the process of FIG. 8 may be omitted.

At step 908, the base station 101 may allocate communications resources for the transmission of uplink data by the communications device 208, and at step 910 may receive data on the allocated communications resources, transmitted by the communications device 208. The allocated communications resources may comprise resources within a resource pool, such as the first resource pool 702.

In response to receiving the data in step 910, the base station 101 may forward the received data to the core network 102 in step 912.

In step 914, the base station 101 receives from the communications device 208 an indication (or otherwise determines) that the communications device 208 has no further data to transmit. At step 916, in response to this receiving or determining at step 914, the base station 101 may allocate the communications resources previously allocated to the communications device 208 to a different communications device.

At step 918, the base station 101 receives a random access preamble (such as the selected random access preamble 660). As described above, the selected random access preamble 660 may be associated with a resource pool, such as the first resource pool 702, which was the resource pool most recently used (of any resource pool) by the communications device 208.

The base station 101 may further determine, based on the selected random access preamble 660 being one of a group of relay preambles (such as those indicated at step 902) that the device that transmitted the selected random access preamble 660 is a communications device acting as a relay.

In addition, the base station 101 may receive, associated with the random access preamble, a data quantity indication, such as the data quantity indication 664 described above.

At step 918 the base station 101 may further receive, associated with the selected random access preamble 660, uplink data and an identity indication (which may comprise respectively the high priority data portion 662 and the identity indication 666 described above).

At step 918 the base station 101 may further receive, associated with the selected random access preamble 660, an RRC message requesting an establishment or resumption of an RRC connection.

If, at step 918, the base station 101 received the high priority data portion 662, then at step 920 the base station may forward this data to the core network.

At step 922 the base station 101 determines communications resources to allocate for the subsequent uplink transmission of data by the communications device 208.

The determination of communications resources in step 922 may depend on the amount of data indicated by the data quantity indication 664 and/or on the resource pool 702 corresponding to the selected random access preamble 660.

The determination of communications resources in step 922 may additionally or alternatively be based on the determination that the device which transmitted the selected random access preamble 660 is a communications device acting as a relay.

For example, the base station 101 may preferably allocate the same resource pool as that associated with the selected random access preamble 660, thus simplifying the subsequent operation of the communications device 208, since the resource pool associated with the selected random access preamble 660 may be the resource pool most recently used for the transmission of uplink data by the communications device 208.

However, for example, if the quantity of data indicated by the data quantity indication 664 indicates that the communications resources of the resource pool associated with the selected random access preamble 660 are either insufficient or excessive for transmission of the uplink data within an acceptable time period.

In some embodiments, the selection of the activated resource pool may be based on a current utilization of one or more resource pools. For example, if the communications resources of the resource pool associated with the selected random access preamble 660 are currently allocated or activated for the use of (i.e. for the transmission of uplink data by) one or more other communications devices, the base station 101 may select as the activated resource pool a resource pool having a lower utilisation or lower congestion level.

In some embodiments, the selection of the activated resource pool may be based on a signal strength or signal quality associated with the received random access preamble. The base station 101 may receive from the non-terrestrial network part 308, together with the relayed random access preamble, an indication of a signal strength and/or a signal quality associated with the random access preamble transmitted by the communications device 208.

The base station 101 may select the activated resource pool based on the signal strength and/or signal quality; for example, where the signal strength and/or signal quality are indicated as low (e.g. below a threshold), the base station 101 may select a resource pool having more communications resources per unit time in order to permit the use of more robust modulation and coding for the transmission of the data by the communications device 208, and vice versa.

Additionally or alternatively, where the signal strength and/or signal quality are indicated as low, the base station 101 may select a resource pool in which the communications resources use frequency hopping (such as the second resource pool 702) in preference to a resource pool which does not use frequency hopping (such as the first resource pool 701).

Having selected communications resources associated with a resource pool (for example, the second resource pool 702), the base station 101 at step 924 transmits to the communications device 208 a random access response message (such as the random access response message 668 of FIG. 6). As described above, the random access response message 668 may comprise an indication of the identity indicated by the identity indication 666 (e.g. for the purposes of contention resolution), an indication of an identity of the activated resource pool, and/or an RRC message, such as an RRC Connection Setup message or an RRC Connection Resume message.

In some embodiments, the base station 101 may determine (not shown in FIG. 8) that no resource pool is to be activated, and/or that no indication of an activated resource pool is to be transmitted. Such a determination may be based on, for example, a level of occupancy or congestion of available resource pools (e.g. if each resource pool is currently activated in respect of one or more communications devices). The determination not to indicate an activated resource pool may additionally or alternatively be based on the RRC state of the communications device. For example, if the communications device 208 is in the RRC Idle mode, then the base station 101 may not indicate If the base station 101 may determine that no resource pool is to be activated, and/or that no indication of an activated resource pool is to be transmitted, the base station may transmit a conventional random access response message to the communications device 208, and the process may subsequently be in accordance with conventional techniques. In some embodiments, such techniques may be modified in accordance with information determined by the base station 101 as a result of the reception of the selected random access preamble and any other indications transmitted by the communications device 208 to the base station 101 together with the selected random access preamble.

At step 926, the base station 101 receives uplink data transmitted by the communications device 208 using the communications resources of the activated resource pool. Prior to step 926, the base station 101 may have not transmitted any indication (other than the random access response transmitted at step 924) to the communications device 208 allocating (in particular, exclusively allocating) to the communications device 208 the communications resources on which the uplink data is transmitted.

At step 928, the base station 101 may forward the data received in step 926 to the core network 102.

One or more other steps in FIG. 8 may be omitted in some embodiments and the steps may be carried out in an order different to that illustrated and described above.

Some embodiments of the present technique may combine features described above in respect of one or more of FIG. 6, FIG. 7 and FIG. 8.

Thus there has been described a method for transmitting data by a communications device in a wireless telecommunications network, the wireless telecommunications network comprising a base station and a non-terrestrial network part, the method comprising: determining that data is to be transmitted by the communications device to the base station via the non-terrestrial part, and in response to the determining, selecting a random access preamble from a group of random access preambles, each of the random access preambles of the group being associated with one or more resource pools of communications resources for transmitting data, and transmitting the selected random access preamble. The method further comprises receiving a random access response transmitted by the base station in response to the transmission of the selected random access preamble, the random access response indicating an identity of an activated resource pool, the activated resource pool being one of the one or more resource pools of communications resources for the transmission of the data to the base station via the non-terrestrial network part, and transmitting at least a portion of the data using the communications resources of the activated resource pool.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of terminal device, but can be applied more generally in respect of any types of terminal device, for example the approaches are not limited to machine type communication devices/IoT devices or other narrowband terminal devices, but can be applied more generally, for example in respect of any type terminal device operating with a wireless link to the communication network.

It will further be appreciated that the principles described herein are not applicable only to LTE-based wireless telecommunications systems, but are applicable for any type of wireless telecommunications system that supports a random access procedure comprising an exchange of random access procedure messages between a terminal device and a base station.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method for transmitting data by a communications device in a wireless telecommunications network, the wireless telecommunications network comprising a base station and a non-terrestrial network part, the method comprising: determining that data is to be transmitted by the communications device to the base station via the non-terrestrial part, in response to the determining, selecting a random access preamble from a group of random access preambles, each of the random access preambles of the group being associated with one or more resource pools of communications resources for transmitting data, and transmitting the selected random access preamble, receiving a random access response transmitted by the base station in response to the transmission of the selected random access preamble, the random access response indicating an identity of an activated resource pool, the activated resource pool being one of the one or more resource pools of communications resources for the transmission of the data to the base station via the non-terrestrial network part, and transmitting at least a portion of the data using the communications resources of the activated resource pool.

Paragraph 2. A method according to Paragraph 1, wherein the communications device is acting as a relay node for one or more terminal devices.

Paragraph 3. A method according to Paragraph 2, wherein selecting the random access preamble comprises selecting the random access preamble from a group of relay preambles allocated for the use of communications devices acting as relays.

Paragraph 4. A method according to Paragraph 2 or Paragraph 3, the method comprising: receiving the data from one of the one or more terminal devices.

Paragraph 5. A method according to any of Paragraphs 1 to 4, the method comprising: determining an amount of the data to be transmitted to the base station via the non-terrestrial part, and transmitting, with the selected random access preamble, an indication of the determined amount of the data.

Paragraph 6. A method according to any of Paragraphs 1 to 5, wherein the indication of the determined amount of data is transmitted in a same transmission time interval as the transmitted selected random access preamble.

Paragraph 7. A method according to any of Paragraphs 1 to 6, wherein the selected random access preamble is selected based on an association between the selected random access preamble and a resource pool most recently previously used by the communications device for the transmission of data to the base station via the non-terrestrial network part.

Paragraph 8. A method according to any of Paragraphs 1 to 7, the method comprising: before transmitting the selected random access preamble, receiving an indication of an association between each of the random access preambles of the group of random access preambles and the one or more resource pools of communications resources for transmitting data.

Paragraph 9. A method according to any of Paragraphs 1 to 8, the method comprising: before transmitting the selected random access preamble, receiving an indication of communications resources and an identity associated with each of the one or more resource pools.

Paragraph 10. A method according to any of Paragraphs 1 to 9, wherein no resource grant is received to allocate the communications resources of the activated resource pool exclusively for the transmission of the data by the communications device.

Paragraph 11. A method according to any of Paragraphs 1 to 10, wherein the communications device is in an inactive or an idle mode when determining that the data is to be transmitted by the communications device to the base station via the non-terrestrial part.

Paragraph 12. A method according to any of Paragraphs 1 to 11, wherein the activated resource pool is associated with the selected random access preamble.

Paragraph 13. A method for receiving at an infrastructure equipment data transmitted by a communications device in a wireless telecommunications network, the wireless telecommunications network comprising a base station and a non-terrestrial network part, the method comprising: receiving a random access preamble, determining that the received random access preamble is one of a group of preambles, each of the random access preambles of the group being associated with one or more resource pools of communications resources for transmitting data, based on the determining, selecting from the one or more resource pools of communications resources an activated resource pool, the activated resource pool comprising communications resources for the transmission of the data by the communications device; transmitting a random access response, the random access response indicating an identity of the activated resource pool, and receiving the data transmitted using the communications resources of the activated resource pool.

Paragraph 14. A method according to Paragraph 13, the method comprising determining that the received random access preamble is allocated for the use of communications devices acting as relays, wherein the activated resource pool is selected based on the determining that the received random access preamble is allocated for the use of communications devices acting as relays.

Paragraph 15. A method according to Paragraph 13 or Paragraph 14, the method comprising: receiving an indication of an amount of the data, wherein the activated resource pool is selected based on the indicated amount of the data.

Paragraph 16. A method according to Paragraph 15, wherein the indication of the amount of the data is received in a same transmission time interval as the received random access preamble.

Paragraph 17. A method according to any of Paragraphs 13 to 16, wherein the activated resource pool is selected based on the resource pool associated with the received random access preamble.

Paragraph 18. A method according to any of Paragraphs 13 to 17, wherein the activated resource pool is associated with the received random access preamble.

Paragraph 19. A method according to any of Paragraphs 13 to 18, the method comprising: before receiving the random access preamble, transmitting an indication of an association between each of the random access preambles of the group of preambles and the one or more resource pools of communications resources for transmitting data.

Paragraph 20. A method according to any of Paragraphs 13 to 19, the method comprising: before receiving the random access preamble, transmitting an indication of communications resources and an identity associated with each of the one or more resource pools.

Paragraph 21. A method according to any of Paragraphs 13 to 20, wherein no resource grant is transmitted to allocate the communications resources of the activated resource pool exclusively for the transmission of the data by the communications device.

Paragraph 22. A method according to any of Paragraphs 13 to 21, wherein the infrastructure equipment is the base station.

Paragraph 23. A method according to any of Paragraphs 13 to 21, wherein the infrastructure equipment is the non-terrestrial network part.

Paragraph 24. A communications device for transmitting data in a wireless telecommunications network, the wireless telecommunications network comprising a base station and a non-terrestrial network part, the communications device comprising controller circuitry and transceiver circuitry configured to operate together such that the communications device is operable: to determine that data is to be transmitted by the communications device to the base station via the non-terrestrial part, in response to the determining, to select a random access preamble from a group of random access preambles, each of the random access preambles of the group being associated with one or more resource pools of communications resources for transmitting data, and to transmit the selected random access preamble, to receive a random access response, transmitted by the base station in response to the transmission of the selected random access preamble, the random access response indicating an identity of an activated resource pool, the activated resource pool being one of the one or more resource pools of communications resources for the transmission of the data to the base station via the non-terrestrial network part, and to transmit at least a portion of the data using the communications resources of the activated resource pool.

Paragraph 25. Circuitry for a communications device for transmitting data in a wireless telecommunications network, the wireless telecommunications network comprising a base station and a non-terrestrial network part, the communications device comprising controller circuitry and transceiver circuitry configured to operate together such that the circuitry is operable: to determine that data is to be transmitted by the communications device to the base station via the non-terrestrial part, in response to the determining, to select a random access preamble from a group of random access preambles, each of the random access preambles of the group being associated with one or more resource pools of communications resources for transmitting data, and to transmit the selected random access preamble, to receive a random access response, transmitted by the base station in response to the transmission of the selected random access preamble, the random access response indicating an identity of an activated resource pool, the activated resource pool being one of the one or more resource pools of communications resources for the transmission of the data to the base station via the non-terrestrial network part, and to transmit at least a portion of the data using the communications resources of the activated resource pool. Paragraph 26. An infrastructure equipment in a wireless telecommunications network, the infrastructure equipment comprising processor circuitry and transceiver circuitry configured to operate together such that the infrastructure equipment is operable: to receive a random access preamble, to determine that the received random access preamble is one of a group of preambles, each of the random access preambles of the group being associated with one or more resource pools of communications resources for transmitting data, based on the determining, to select from the one or more resource pools of communications resources an activated resource pool, the activated resource pool comprising communications resources for the transmission of the data by the communications device; to transmit a random access response, the random access response indicating an identity of the activated resource pool, and to receive the data transmitted using the communications resources of the activated resource pool.

Paragraph 27. Circuitry for an infrastructure equipment in a wireless telecommunications network, the infrastructure equipment comprising processor circuitry and transceiver circuitry configured to operate together such that the circuitry is operable: to receive a random access preamble, to determine that the received random access preamble is one of a group of preambles, each of the random access preambles of the group being associated with one or more resource pools of communications resources for transmitting data, based on the determining, to select from the one or more resource pools of communications resources an activated resource pool, the activated resource pool being one of the one or more resource pools of communications resources for the transmission of the data by the communications device; to transmit a random access response, the random access response indicating an identity of the activated resource pool, and to receive the data transmitted using the communications resources of the activated resource pool.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP TR 38.811 "Study on New Radio (NR) to support non terrestrial networks (Release 15)", December 2017
[2] Holma H. and Toskala A, "LTE for UMTS OFDMA and SC-FDMA based radio access", John Wiley and Sons, 2009

What is claimed is:
1. A method for transmitting data by a communications device in a wireless telecommunications network, the wireless telecommunications network comprising a base station and a non-terrestrial network part, the method comprising:
   determining that data is to be transmitted by the communications device to the base station via the non-terrestrial part;
   in response to the determining that the data is to be transmitted:
      selecting a random access preamble, from a group of random access preambles in which each of the random access preambles of the group is associated with one or more resource pools of communications resources for transmitting data, based on an association between the random access preamble and a resource pool most recently used by the communications device for transmission of data to the base station via the non-terrestrial network part; and
      transmitting the random access preamble;
   receiving a random access response transmitted by the base station in response to transmission of the random access preamble, the random access response indicating an identity of an activated resource pool that is one of the one or more resource pools of communications resources for the transmission of the data to the base station via the non-terrestrial network part; and transmitting at least a portion of the data using the communications resources of the activated resource pool.

2. The method according to claim 1, wherein the communications device is acting as a relay node for one or more terminal devices.

3. The method according to claim 2, wherein the selecting the random access preamble comprises selecting the random access preamble from a group of relay preambles allocated for the use of communications devices acting as relays.

4. The method according to claim 2, further comprising receiving the data from one of the one or more terminal devices.

5. The method according to claim 1, further comprising: determining an amount of the data to be transmitted to the base station via the non-terrestrial part; and transmitting, with the selected random access preamble, an indication of the determined amount of the data.

6. The method according to claim 1, wherein the indication of the determined amount of data is transmitted in a same transmission time interval as the transmitted selected random access preamble.

7. The method according to claim 1, further comprising receiving, before transmitting the selected random access preamble, an indication of an association between each of the random access preambles of the group of random access preambles and the one or more resource pools of communications resources for transmitting data.

8. The method according to claim 1, comprising receiving, before transmitting the selected random access preamble, an indication of communications resources and an identity associated with each of the one or more resource pools.

9. The method according to claim 1, wherein the communications device is in an inactive or an idle mode when determining that the data is to be transmitted by the communications device to the base station via the non-terrestrial part.

10. The method according to claim 1, wherein the activated resource pool is associated with the selected random access preamble.

11. An infrastructure equipment in a wireless telecommunications network, the infrastructure equipment comprising:
processor circuitry and transceiver circuitry configured to operate together to:
receive a random access preamble;
determine that the random access preamble is one of a group of preambles in which each of the random access preambles of the group is associated with one or more resource pools of communications resources for transmitting data, wherein the random access preamble has been selected based on an association between the random access preamble and a resource pool most recently used by the communications device for transmission of data to the base station via the non-terrestrial network part;
based on a determination that the random access preamble is one of the group of preambles, select from the one or more resource pools of communications resources an activated resource pool, the activated resource pool comprising communications resources for transmission of the data by the communications device;
transmit a random access response, the random access response indicating an identity of the activated resource pool; and
receive the data transmitted using the communications resources of the activated resource pool.

12. A method for transmitting data by a communications device in a wireless telecommunications network, the wireless telecommunications network comprising a base station and a non-terrestrial network part, the method comprising:
determining that data is to be transmitted by the communications device to the base station via the non-terrestrial part;
in response to the determining that the data is to be transmitted:
selecting a random access preamble, from a group of random access preambles in which each of the random access preambles of the group is associated with one or more resource pools of communications resources for transmitting data; and
transmitting the random access preamble;
receiving a random access response transmitted by the base station in response to transmission of the random access preamble, the random access response indicating an identity of an activated resource pool that is one of the one or more resource pools of communications resources for the transmission of the data to the base station via the non-terrestrial network part; and
transmitting at least a portion of the data using the communications resources of the activated resource pool, wherein
no resource grant is received to allocate the communications resources of the activated resource pool exclusively for transmission of the data by the communications device.

13. The method according to claim 12, wherein the communications device is acting as a relay node for one or more terminal devices.

14. The method according to claim 13, wherein the selecting the random access preamble comprises selecting the random access preamble from a group of relay preambles allocated for the use of communications devices acting as relays.

15. The method according to claim 13, further comprising receiving the data from one of the one or more terminal devices.

16. The method according to claim 12, further comprising:
determining an amount of the data to be transmitted to the base station via the non-terrestrial part; and
transmitting, with the selected random access preamble, an indication of the determined amount of the data.

17. The method according to claim 12, wherein the indication of the determined amount of data is transmitted in a same transmission time interval as the transmitted selected random access preamble.

18. The method according to claim 12, further comprising receiving, before transmitting the selected random access preamble, an indication of an association between each of the random access preambles of the group of random access preambles and the one or more resource pools of communications resources for transmitting data.

19. The method according to claim 12, further comprising receiving, before transmitting the selected random access preamble, an indication of communications resources and an identity associated with each of the one or more resource pools.

20. The method according to claim 12, wherein the communications device is in an inactive or an idle mode when determining that the data is to be transmitted by the communications device to the base station via the non-terrestrial part.

* * * * *